US009673647B2

(12) United States Patent
Kim et al.

(10) Patent No.: US 9,673,647 B2
(45) Date of Patent: Jun. 6, 2017

(54) CHARGING APPARATUS FOR MOBILE DEVICE

(71) Applicant: SPS, INC., Daejeon (KR)

(72) Inventors: Hyun-Jun Kim, Daejeon (KR);
Dae-Young Youn, Seoul (KR);
Jung-Gyo Kim, Daejeon (KR);
Seung-Ju Jeong, Daejeon (KR);
Hyo-Nam Kim, Daejeon (KR)

(73) Assignee: SPS, INC., Daejeon (KR)

( * ) Notice: Subject to any disclaimer, the term of this patent is extended or adjusted under 35 U.S.C. 154(b) by 210 days.

(21) Appl. No.: 14/411,857

(22) PCT Filed: Oct. 5, 2012

(86) PCT No.: PCT/KR2012/008065
§ 371 (c)(1),
(2) Date: Dec. 29, 2014

(87) PCT Pub. No.: WO2014/010781
PCT Pub. Date: Jan. 16, 2014

(65) Prior Publication Data
US 2015/0171649 A1  Jun. 18, 2015

(30) Foreign Application Priority Data

Jul. 9, 2012 (KR) .................. 10-2012-0074679

(51) Int. Cl.
*H02J 7/00* (2006.01)
(52) U.S. Cl.
CPC ..... *H02J 7/0044* (2013.01); *H02J 2007/0062* (2013.01)

(58) Field of Classification Search
USPC ....................................... 320/113
See application file for complete search history.

(56) References Cited

U.S. PATENT DOCUMENTS

| 2010/0080563 A1 | 4/2010 | DiFonzo et al. |
| 2010/0090652 A1* | 4/2010 | Takeda ............... H01M 10/443 320/134 |

(Continued)

FOREIGN PATENT DOCUMENTS

| JP | S63274070 A | 11/1988 |
| JP | 2005510191 A | 4/2005 |

(Continued)

OTHER PUBLICATIONS

ISA Korean Intellectual Property Office, Search Report of PCT/KR2012/008065, Sep. 26, 2012, WIPO, 2 pages.

*Primary Examiner* — Robert Grant
(74) *Attorney, Agent, or Firm* — McCoy Russell LLP

(57) ABSTRACT

A charging apparatus for a mobile device is provided. The apparatus includes a terminal casing and a charging mount. A pattern electrode part has concentric electrode patterns. A first magnet is provided underneath the pattern electrode part, and a second magnet having multiple magnet elements is disposed around the pattern electrode part. The charging mount has a pin terminal part which comes into contact with the pattern electrode part. A third magnet being magnetically coupled with the first magnet is provided underneath the pin terminal part. A fourth magnet being magnetically coupled with the second magnet is provided around the pin terminal part.

16 Claims, 9 Drawing Sheets

(56) References Cited

U.S. PATENT DOCUMENTS

| | | | |
|---|---|---|---|
| 2011/0192857 A1 | 8/2011 | Rothbaum et al. | |
| 2012/0021619 A1 | 1/2012 | Bilbrey et al. | |
| 2012/0206090 A1* | 8/2012 | Hyun-Jun | H02J 7/025 320/107 |
| 2012/0295451 A1* | 11/2012 | Hyun-Jun | H01R 13/6205 439/39 |
| 2013/0058023 A1* | 3/2013 | Supran | G06F 1/1632 361/679.01 |

FOREIGN PATENT DOCUMENTS

| | | | |
|---|---|---|---|
| JP | 2008294793 A | 12/2008 |
| KR | 1020050089360 A | 8/2005 |
| KR | 1020070003171 A | 5/2007 |
| KR | 1020110012331 A | 9/2011 |
| KR | 20110120483 A | 11/2011 |
| WO | 2011136498 A2 | 11/2011 |

* cited by examiner

CHARGING APPARATUS FOR MOBILE DEVICE

CROSS REFERENCE TO RELATED APPLICATIONS

The present application is a U.S. National Phase of International Patent Application Serial No. PCT/KR2012/008065, entitled "CHARGING APPARATUS FOR MOBILE DEVICE," filed on Oct. 5, 2012, which claims priority to Korean Patent Application No. 10-2012-0074679, entitled "CHARGING APPARATUS FOR MOBILE DEVICE," filed on Jul. 9, 2012, the entire contents of each of which are hereby incorporated by reference for all purposes.

TECHNICAL FIELD

The present invention relates, in general, to a charging apparatus for a mobile device and, more particularly, to a charging apparatus for a mobile device which charges the mobile device by magnetically coupling the mobile device with a charger using magnets while mutually matching electrical terminals.

BACKGROUND ART

Mobile devices such as cellular phones, smart phones and personal digital assistants (PDAs) are widely used since they generally have good mobility and portability. Accordingly, wired chargers for charging batteries of mobile devices are fabricated in different shapes depending on the shapes or standards of batteries which are manufactured for them. In response to trends toward improved performance and lightness of mobile devices which are intended to satisfy consumers' demands, even a single manufacturer fabricates various types of mobile devices and various types of corresponding chargers.

Mobile devices are supplied with direct current (DC) power via a power supply such as an adaptor or charge an internal battery using a DC power that is supplied via the power supply. The adaptor is a device that converts an alternating current (AC) voltage which is an input supply voltage into a DC voltage.

A male connector of the adaptor is required to be coupled to a female connector of a mobile device so that the mobile device is supplied with DC power.

However, the method of coupling the connectors by fitting the male connector into the female connector may damage the connectors while they are being coupled. In addition, it is required to find the female connector which is disposed in the mobile device and vertically fit and pull the male connector into or out of the female connector, which is problematic. Some approaches that use a magnet to connect in order to reduce such problems have been developed for a long time, and were introduced in Japanese Laid-Open Patent Application No. 1988-274070 (published Nov. 11, 1988; titled: CONNECTING DEVICE), United States Patent Application Publication No. 2010-0080563 (published Apr. 1, 2010; titled: MAGNETIC CONNECTOR WITH OPTICAL SIGNAL PATH), United States Patent Application Publication No. 2012-0021619 (published Jan. 26, 2012.01.26; titled: PROGRAMMABLE MAGNETIC CONNECTORS), and the like.

A charging apparatus using such a magnet was also introduced in Korean Patent No. 1116159 (patented Feb. 7, 2012; titled: TERMINAL CONNECTING MODULE AND TERMINAL CONNECTING APPARATUS HAVING THE SAME). In this connecting module, a first connector body freely rotates with respect to a second connector body. However, it is not possible to fix the first connector body at an intended angle. In addition, the second connector body has a plurality of pattern-forming portions, which increases its size.

Recently, new types of chargers have been introduced, attributable to the development of technologies. Such chargers use a non-contact charging method in which a battery is charged via magnetic induction without electrical contacts in order to solve the problems related to the traditional charging methods. However, non-contact chargers are complicated to design and expensive to manufacture, which is problematic.

DISCLOSURE

Technical Problem

Accordingly, the present invention has been made keeping in mind the above problems occurring in the related art, and is intended to provide a charging apparatus for a mobile device which charges the mobile device by magnetically coupling the mobile device and a charging mount using magnets while mutually matching electrical terminals.

The present invention is also intended to provide a charging apparatus for a mobile device which allows the mobile device to be freely attached to and detached from and rotated on the charging mount at any angle based on the arrangement of magnets, thereby improving convenience when charging the mobile device.

The technical problems of the present invention are not limited to the above-mentioned problems, and other technical problems that are not described may be definitely understood by those skilled in the art to which the present invention pertains, when reading the description below.

Technical Solution

In an aspect, the present invention provides a charging apparatus for a mobile device, including a terminal casing and a charging mount, wherein: the terminal casing has a connector to be connected with a charging terminal of the mobile device, a pattern electrode part having concentric electrode patterns is provided on a backside thereof such that the pattern electrode is electrically connected with the connector, a first magnet is provided underneath the pattern electrode part, and a second magnet having multiple magnet elements is disposed around the pattern electrode part such that magnet elements are at the same distance from the pattern electrode; and the charging mount has a pin terminal part having terminal pins in a type of a flat spring which is to come into contact with the pattern electrode part, a third magnet is magnetically coupled with the first magnet and is provided underneath the pin terminal part, and a fourth magnet is magnetically coupled with the second magnet and has multiple magnet elements and is provided around the pin terminal part such that magnet elements are at the same distance from the pin terminal part in order to allow the terminal casing to be rotatable at a predetermined angle.

In an embodiment, the magnet elements of the second magnet in the terminal casing may be symmetrically disposed with each other along a circumference about the center of the pattern electrode part, and the magnet elements of the fourth magnet in the charging mount may be disposed at positions that correspond to those of the second magnet.

In an embodiment, the second magnet may have at least four magnet elements, which are disposed at the same distance from each other, such that the terminal casing is rotatable by 90° on the charging mount, and the magnet elements of the fourth magnet may be disposed at positions that correspond to those of the second magnet.

In an embodiment, the charging mount may further include a power delay circuit part mounted between an external input connector and the pin terminal part and designed to delay a power supply to the pin terminal part and to monitor the power supply to the pin terminal part whether or not a power level is below a predetermined level, and if the monitoring result is positive, to cut off the power supply to the pin terminal part.

In an embodiment, the first and second magnets of the terminal casing may have opposite polarities to each other, and the third and fourth magnets of the charging mount may have opposite polarities to each other.

In an embodiment, the second and fourth magnets may have smaller sizes than those of the first and third magnets, respectively, and the sizes of the second and fourth magnets may be the same.

In an embodiment, the terminal pins of the pin terminal part and the electrode patterns of the pattern electrode part are disposed in a 1:1 matching manner such that the terminal pins are alternately disposed laterally at different distances from a central terminal pin that corresponds to a central electrode pattern of the pattern electrode part.

In another aspect, the present invention provides a charging apparatus for a mobile device including a terminal casing and a charging terminal unit, wherein: the terminal casing has a connector to be connected with a charging terminal of the mobile device, a pattern electrode part having concentric electrode patterns is provided on a backside thereof such that the pattern electrode is electrically connected with the connector, and a first magnet is provided underneath the pattern electrode part; and the charging terminal unit has a pin terminal part having terminal pins in a type of a flat spring which is to come into contact with the pattern electrode part, wherein a third magnet is magnetically coupled with the first magnet and is provided underneath the pin terminal part.

In an embodiment, a USB connector may be provided to one side of the charging terminal unit to receive DC power.

Advantageous Effects

According to the present invention, the charging apparatus for a mobile device charges the mobile device by magnetically coupling the mobile device and the charging mount using magnets while mutually matching electrical terminals, improving convenience when charging the mobile device.

Further, when charging the mobile terminal, the terminal is coupled to the charging mount magnetically rather than mechanically, so that there is no need for separate efforts for coupling using connectors, and damage occurring due to frequent mounting can be fundamentally avoided.

Further, the charging apparatus allows the mobile device to be freely attached to and detached from and rotated on the charging mount at any angle based on the arrangement of magnets, thereby improving convenience when charging the mobile device. Furthermore, when charging the mobile device, the terminal and the charging mount are coupled using simple magnetic coupling with magnets, so that the mobile device can be quickly coupled to the charging mount like an existing wired charger, and the charging operation becomes easy like an existing non-contact point type of charger that uses magnetic induction.

MODE FOR INVENTION

Figure 1:
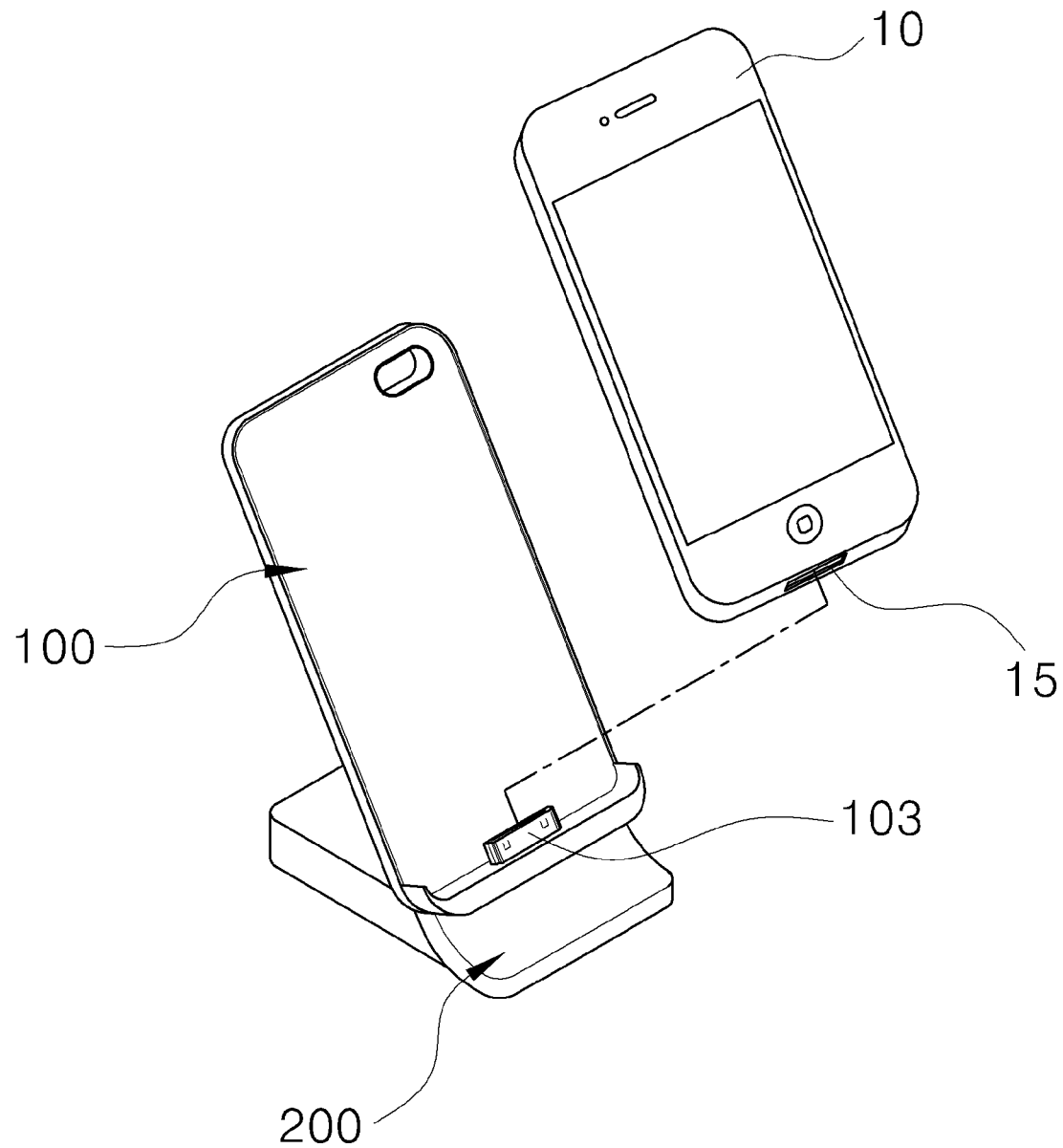
FIGS. 1 and 2 are views illustrating a charging apparatus for a mobile device according to an embodiment of the present invention.

Hereinbelow, preferred embodiments of the present invention will be described in detail with reference to the accompanying drawings. Wherever possible, the same reference numerals will be used throughout the drawings and the description to refer to the same or like parts. In the following description, it is to be noted that, when the functions of conventional elements and the detailed description of elements related with the present invention may make the gist of the present invention unclear, a detailed description of those elements will be omitted.

Figure 2:
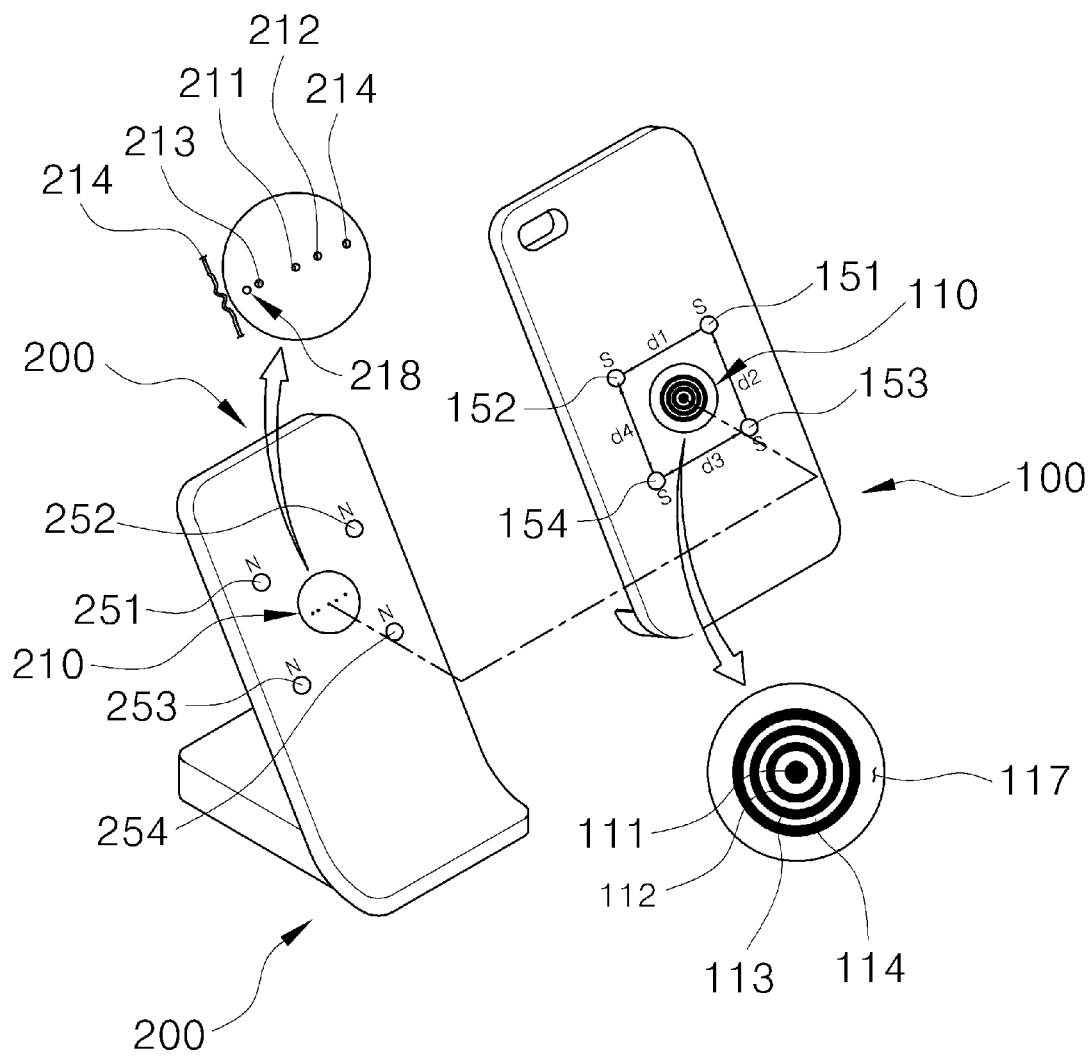

FIGS. 1 and 2 are views illustrating a charging apparatus for a mobile device according to an embodiment of the present invention, wherein the charging apparatus includes a terminal casing 100 and a charging mount 200.

The terminal casing 100 is formed of a resilient substrate that is made of a polymer or plastic. The terminal casing includes, at a lower portion, a connector 103 that is to be connected with a charging terminal 15 of a mobile device 10. The terminal casing also includes a circular pattern electrode part 110 which is formed on the surface of a backside in such a manner as to be electrically connected with the connector 103. The terminal casing includes therein a first magnet 130 which is provided underneath the pattern electrode part 110 and a second magnet 150 consisting of magnet elements which are circumferentially provided at a distance from the pattern electrode part 110. Here, the first magnet 130 should be provided underneath the pattern electrode part 110 owing to operative correlation with electrode patterns 111 to 114 of the pattern electrode part, whereas the second magnet 150 may be disposed inside or outside of the terminal casing. The pattern electrode part 110 is configured such that circular electrode patterns 111 to 114 are concentrically arranged on a circular base 117, wherein the electrode patterns 111 to 114 respectively serve as power terminals 113 (V+) and 114 (GND) and data terminals 111 (D+) and 112 (D−) which are concentrically arranged.

The charging mount 200 includes a pin terminal part 210 which corresponds to the pattern electrode part 110. The pin terminal part 210 includes flat spring type pin terminals 211 (D+), 212 (D−), 213 (V+), and 214 (GND), which are brought into contact with the electrode patterns 111 to 114, respectively. The charging mount includes therein a third magnet 230 which is provided underneath the pin terminal part 210 and which is magnetically coupled with the first magnet 130, and a fourth magnet 250 consisting of magnet elements which are circumferentially provided at a distance from the pin terminal part 210 and which are magnetically coupled with the second magnet 150. Here, the third magnet 230 should be provided underneath the pin terminal part 210 owing to operative correlation with the terminal pins 211 to 214 of the pin terminal part, whereas the fourth magnet 250 may be disposed inside or outside of the charging mount.

The charging mount 200 may be connected with an adapter which converts an external AC voltage input to DC power.

The magnet elements of the second magnet are disposed in the terminal casing 100 around the pattern electrode part 110 such that the magnet elements are symmetrically arranged with respect to horizontal and vertical axes about the center of the pattern electrode part 110. The magnet elements of the fourth magnet 250 of the charging mount 200 are disposed at positions that correspond to those of the second magnet 150.

The first and second magnets 130 and 150 of the terminal casing 100 may have magnetic polarities that are opposite each other. The third and fourth magnets 230 and 250 of the charging mount 200 may also have magnetic polarities that are opposite each other. For example, if the first magnet 130 has an N-polarity, the second magnet 150 has an S-polarity, and if the third magnet 230 has an N-polarity, the fourth magnet 250 has an S-polarity.

The pin terminal part 210 of the charging mount 200 is arranged such that terminal pins 211 to 214 thereof (that are flat springs) respectively partially project out in a shape of a spot through holes 218. The terminal pins 211 to 214 are disposed parallel with each other such that the positions thereof correspond in a 1:1 matching manner to those of the electrode patterns 111 to 114 that are concentrically disposed. The 1:1 matching manner therebetween may also be such that the terminal pins 212 to 214 are alternately disposed laterally at different distances from the central terminal pin 211 that corresponds to the central electrode pattern 111 of the pattern electrode. Here, the ground pin 214 (GND) may consist of a plurality of pins for the sake of safety of power supply.

Figure 3:
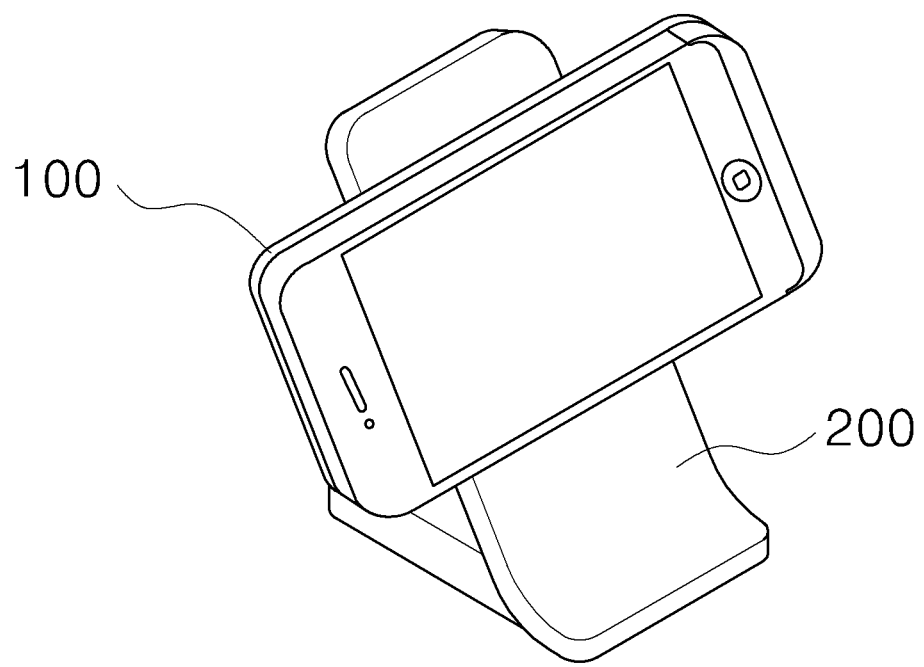
FIG. 3 is a view illustrating a terminal casing having being rotated on a charging mount.

As shown in FIG. 3, the magnet elements of the second magnet 150 may be provided with at least four magnet elements 151 to 154 to enable the terminal casing 100 to be rotated at a predetermined angle on the charging mount. Distances d1, d2, d3, and d4 between the magnet elements 151 to 154 may be the same. Here, the respective magnet elements 151 to 154 are identically separated from the central electrode pattern 111. It is natural for the magnet elements of the fourth magnet 250 in the charging mount to be disposed at positions that correspond to those of the second magnet 150.

Figure 4:
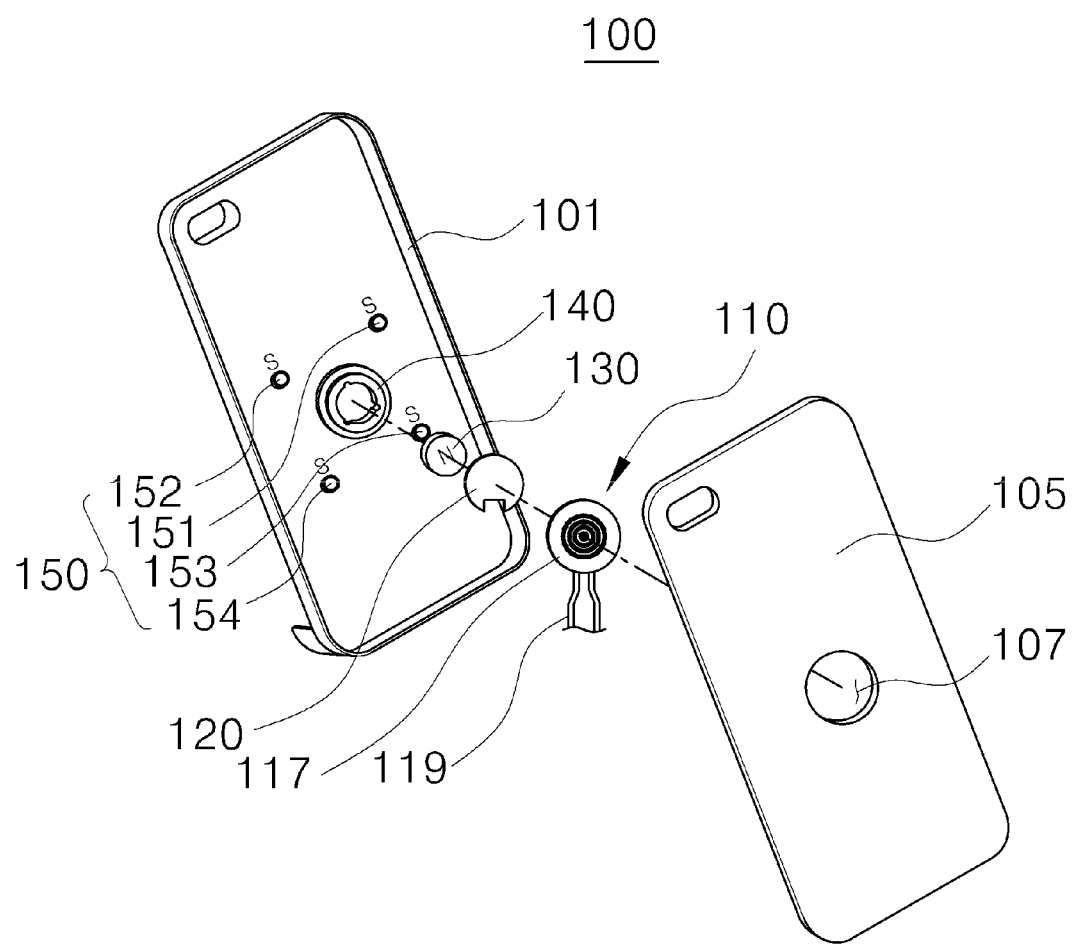
FIG. 4 is a view illustrating the disassembled terminal casing.

A shown in FIG. 4, the terminal casing 100 includes a main body part 101 and a backside cover part 105 with an internal space formed therebetween. The first magnet 130 is fixedly mounted inside of the main body part 101 by a support 140, and the magnet elements of the second magnet 150 are respectively mounted around the first magnet 130 at a regular distance therefrom. The backside cover part 105 has a central opening 107 to which the circular substrate 107 of the pattern electrode part 110 is fitted in such a manner so as to be coupled with the support 140 with a spacer 120 interposed therebetween, such that the pattern electrode part 110 is exposed to the outside. The support 140 is bonded to the inside of the main body part 101 by means of an adhesive, ultrasonic bonding, etc. The spacer 120 may be welded to the support 140. Lead wires 119 are solder-welded to a lower portion of the pattern electrode part 110 so as to electrically connect with the connector 103 that is disposed in front of the main body part. Here, the second magnet 150 may be fixedly mounted in the side of the backside cover part 105 rather than inside of the main body part 101.

As shown in FIG. 4, the second magnet 140 may be formed in a small size in order to have less magnetic force than the first magnet 130. If the magnetic force of the second magnet 150 is higher than that of the first magnet 130, it may not be easy for the terminal casing 100 to be freely rotated on the charging mount 200. That is, since the first magnet 130 serves as a rotation axis when the terminal casing rotates, having higher magnetic force may be advantageous in the context of stability of rotation. However, since the second magnet 150 is not a rotation axis, but a rotator, weak magnet force is advantageous for free rotation. For such reasons, it is preferred that the fourth magnet 250 of the charging mount 200 is also formed in a size that is smaller than that of the third magnet 230.

Figure 5:
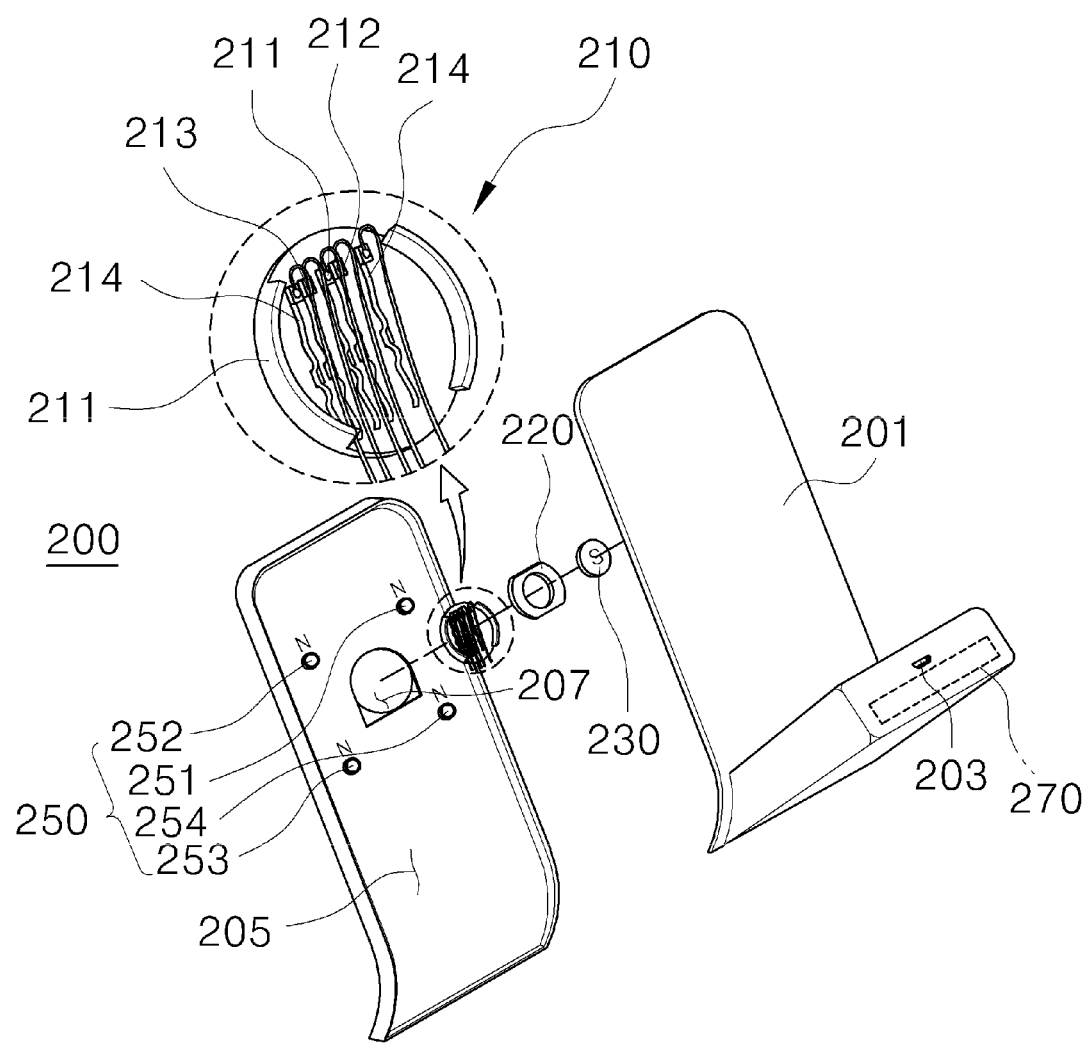
FIG. 5 is a view illustrating the disassembled charging mount.

As shown in FIG. 5, the charging mount 200 includes a main body part 201 and a front cover part 205 with an internal space formed therebetween. The third magnet 230 is fixedly mounted inside of the main body part 201 by a fixing member 220, and the pin terminal part 210 is fixedly mounted to the main body part 201 while being coupled to the fixing member 220. The magnet elements of the fourth magnet 250 are respectively mounted on the backside of the front cover part 205 around the third magnet 230 at a regular distance therefrom. The front cover part 205 has a central opening 207 to which the disc type pin terminal part 210 is fitted in such a manner so as to be exposed to the outside. Lead wires 219 of the terminal pins 211 to 214 are solder-welded to one side of the respective pins so as to electrically connect with the connector 203 that is provided on the main body part 201. An adapter may be connected to the connector 203. Like the electrode patterns 111 to 114, the terminal pins 211 to 214 may be formed as power terminals 213 (V+) and 214 (GND) and data terminals 211 (D+) and 212 (D−).

Here, for precise matching between the pattern electrode part 110 of the terminal casing 100 and the pin terminal part 210 of the charging mount 200, a precise arrangement between the first and third magnets 130 and 230 and between the second and fourth magnets 150 and 250 is a key point.

Figure 6:
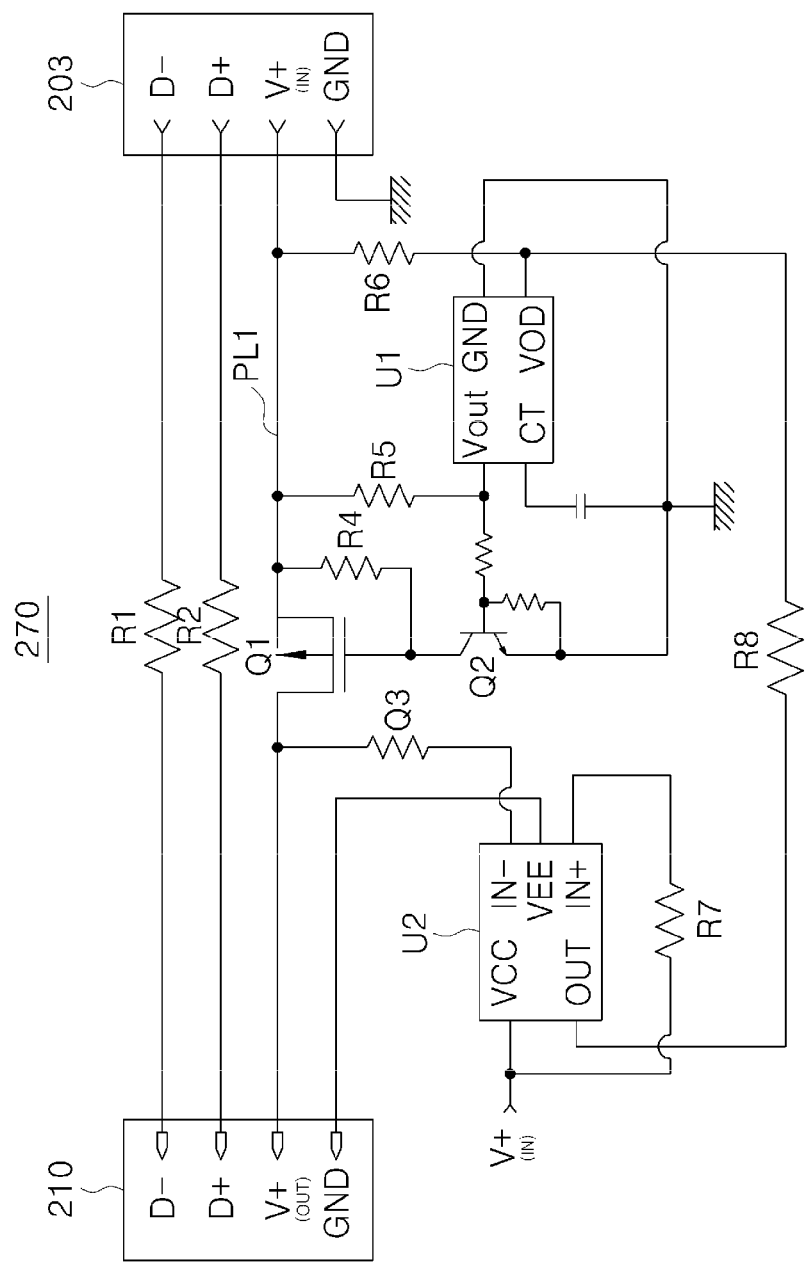
FIG. 6 is a circuit diagram illustrating a power delay circuit part.

As shown in FIG. 6, a power delay circuit part 270 is provided between the connector 203 and the pin terminal part 210 of the main body part 201. Since the contact between the pattern electrode part 110 and the pin terminal part 210 is carried out using the magnetic force, the two parts may be mismatched each other, inducing a short-circuit. The power delay circuit part serves to prevent a situation in which such a short-circuit occurs. If such a short-circuit occurs, an internal circuit such as an adapter of a power supply may be damaged.

That is, the power delay circuit part 270 is configured to delay power supply to the pin terminal part 210 and to monitor the power supply to the pin terminal part 210 such that if the power level is below a predetermined level, it cuts off the power supply to the pin terminal part 210. The power delay circuit part 270 includes a first switching element Q1, a second switching element Q2, a power protector U1, and an operation amplifier U2.

The first switching element Q1 is configured such that a current path is connected to a power line PL1 between the input connector 203 and the power terminal (V+) of the pin terminal part 210 so that a switching operation is conducted depending on a control signal input. The second switching element Q2 is configured such that a current path is connected between a gate of the first switching element Q1 and ground (GND) so that a switching operation is conducted depending on a control signal input.

The power protector U1 is designed to sequentially turn on the second switching element Q2 and the first switching element Q1 if the power level of the power line PL1 is above a predetermined level, and thus control the first switching element Q1 according to external voltage.

The operation amplifier U2 serves to detect voltages across terminals of the first switching element Q1, and if voltages are different from each other, control the power protector U1 to turn the first switching element Q1 off.

The power delay circuit part 270 is designed to apply power to the VDD terminal of the power protector U1 when power is applied from an adapter or a computer via the connector 203 to activate the Vout to sequentially turn on the second switching element Q2 and the first switching element Q1 to supply power to the power terminal (V+) of the pin terminal part 210. Here, if a voltage above a certain level is applied to the VDD terminal of the power protector U1, Vout turns the first switching element Q1 on after a predetermined time has elapsed.

If a short-circuit occurs when the pattern electrode part 110 of the terminal casing 100 comes into contact with the pin terminal part 210 of the charging mount 200, the applied voltage drops below a predetermined level. Then, the voltage that is applied to the VDD terminal of the power protector U1 via a sixth resistor R6 is also identified to be below a certain level. Accordingly, the first switching element Q1 is turned off via the Vout, so that power supply to the power terminal (V+) of the pin terminal part 210 is cut off. This protector circuit is thus provided to avoid problems in that, when the terminal casing 100 is coupled to the charging mount 200, a malfunction occurs to generate an overload to the power supply. Accordingly, even upon occurrence of an electrical short-circuit when coupling the terminal casing to the charging mount, internal circuits of an adapter or a USB circuit of a computer are not damaged.

The operation amplifier U2 serves to detect the power levels across the first switching element Q1 and reduce the level of the VDD terminal of the power protector U1 below a predetermined level via the Vout terminal. Accordingly, the amplifier turns off the first switching element Q1 via the Vout terminal of the power protector U1 to protect the USB port of an adapter or computer. This prevents an event that power is applied to the power terminal (V+) of the pin terminal part 210 so that power reversely flows to the USB port of the adapter or computer.

Figure 7:
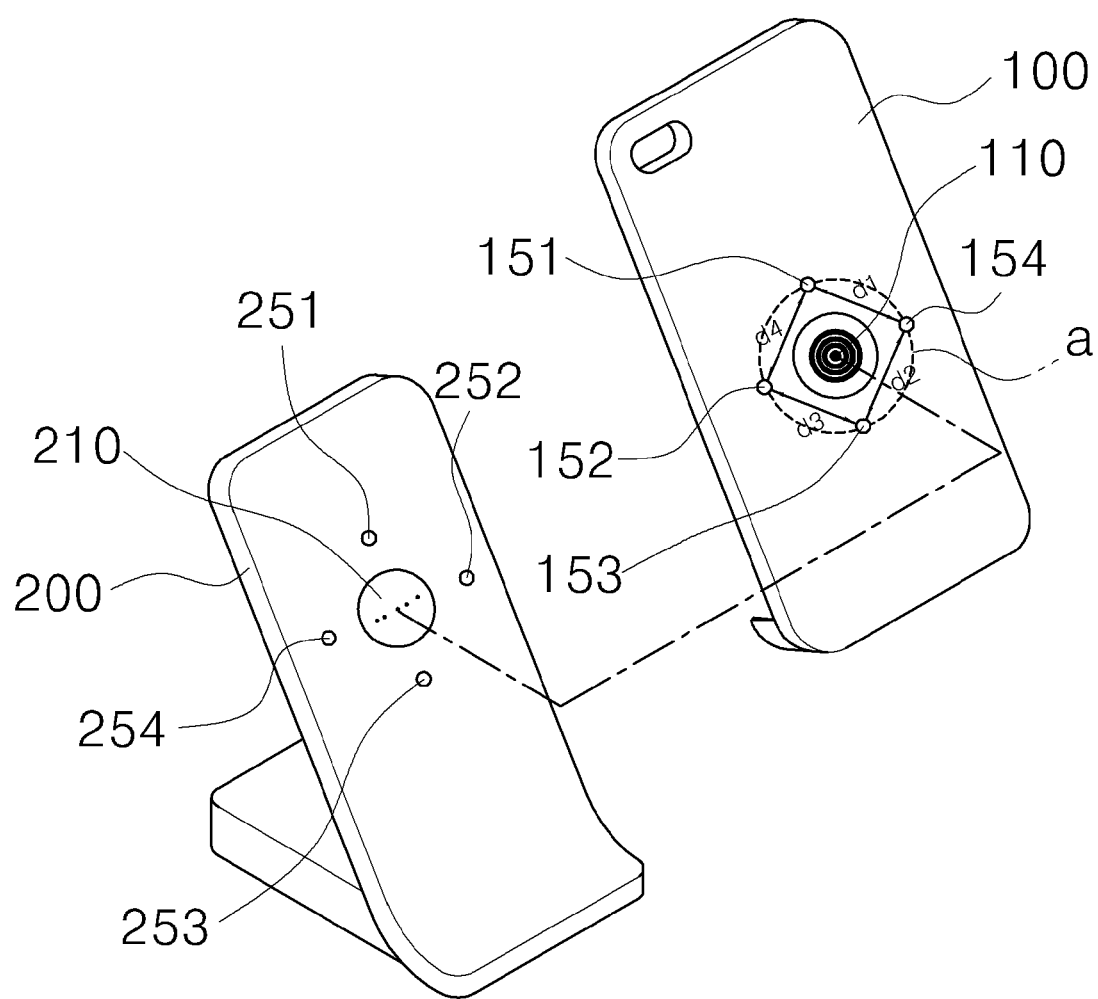
FIG. 7 is a view illustrating an alternative arrangement of second and fourth magnets.

In the meantime, as shown in FIG. 7, the arrangement of the second and fourth magnets 150 and 250 may be different from the arrangement shown in FIG. 2. A difference from the arrangement in FIG. 2 is that the magnet elements of the second magnet 150 disposed around the pattern electrode part 110 of the terminal casing 100 are mounted in a direction of the vertical and horizontal axes about the pattern electrode part 110. Here, the magnet elements 141 to 154 of the second magnet are disposed at the same distance from the center of the pattern electrode part 110, and the distances d1, d2, d3, and d4 between adjacent magnet elements are the same. The magnet elements 251 to 254 of the fourth magnet in the charging mount 200 are also disposed at positions that correspond to those of the second magnet elements 151 to 154.

That is, in the embodiment, four magnet elements 151 to 154 are arranged along a circumference (a) about the center of the pattern electrode part 110 such that the distances d1, d2, d3, and d4 between respective magnet elements 151 to 154 are the same.

In such arrangement of the second magnet 150, the terminal casing 100 can be rotated by 90° on the charging mount 200.

Figure 8:
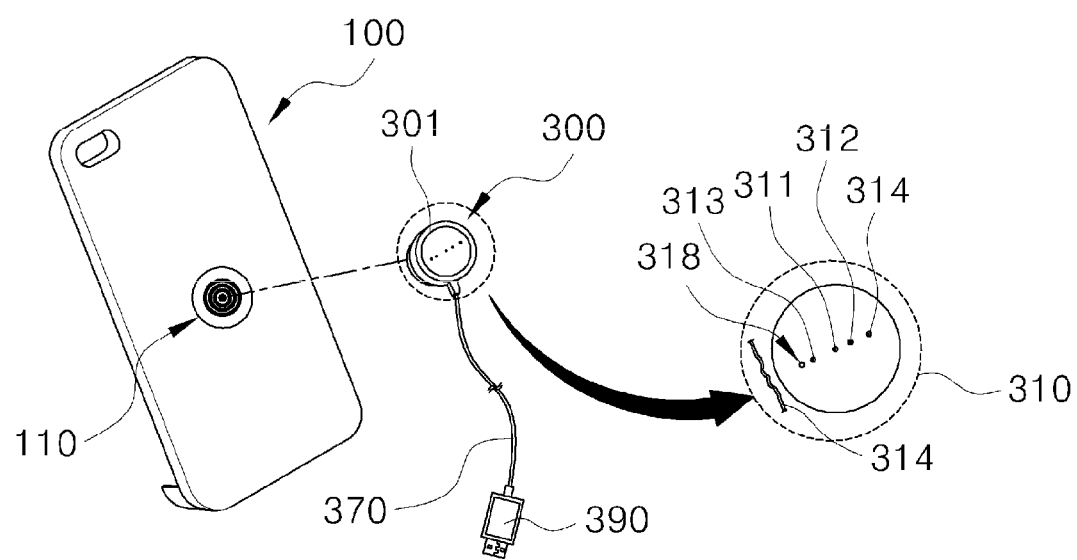
FIGS. 8 and 9 are views illustrating a charging apparatus for a mobile device according to another embodiment of the present invention.
Figure 9:
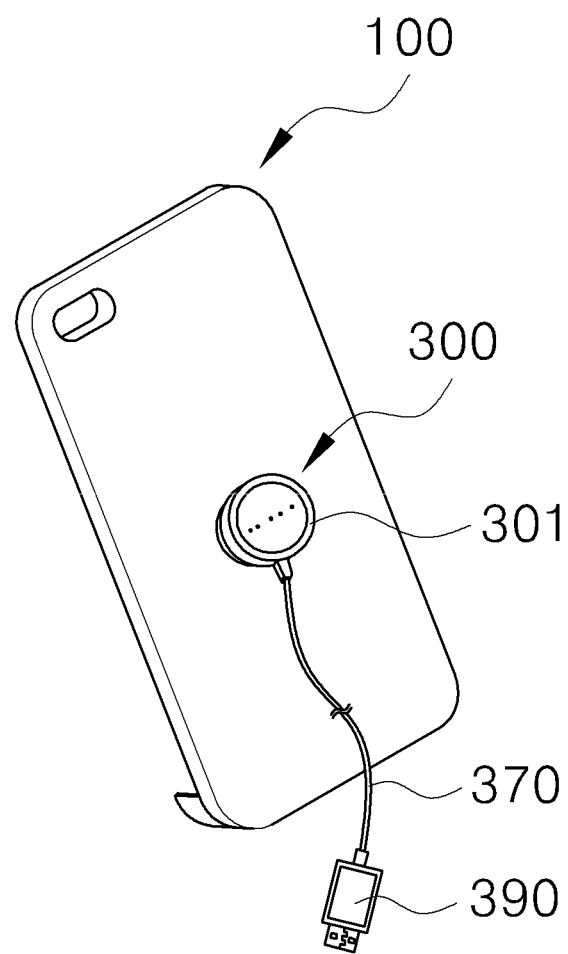

FIGS. 8 and 9 are views illustrating a charging apparatus for a mobile device according to another embodiment of the present invention, wherein the charging apparatus includes a terminal casing 100 and a charging terminal 300. FIG. 8 shows the terminal casing 100 and the charging terminal 300 which are being disassembled, and FIG. 9 shows the terminal casing 100 and the charging terminal 300 which are being assembled.

The terminal casing 100 includes a circular pattern electrode part 110 on the backside and having electrode patterns 111 to 114 that are concentrically disposed. The first magnet 130 is provided underneath the pattern electrode 110. Here, the construction of the terminal casing may be the same as that of FIG. 4, with the exception that the second magnet is not required.

The charging terminal 300 has a housing 301 which includes a pin terminal part 310 in the type of a flat spring, wherein the pin terminal part consists of multiple terminal pins which respectively come into contact with the electrode patterns 111 to 114, and a third magnet (not shown) which is provided underneath the pin terminal part 310 and which is magnetically coupled with the first magnet 130. A USB connector 390 is connected to one side of the charging terminal 300 in order to receive DC power via a cable 370.

The pin terminal part 310 of the charging terminal 300 is arranged such that terminal pins thereof that are flat springs respectively partially project out in a shape of a spot through holes 318. The terminal pins are disposed parallel with each other such that the positions thereof correspond in a 1:1 matching manner to those of the electrode patterns of the pattern electrode 110 that are concentrically disposed. The 1:1 matching manner therebetween may also be such that the terminal pins 312 to 314 are alternately disposed laterally at different distances from the central terminal pin 311 that corresponds to the central electrode pattern 111 of the pattern electrode 111 to 114. The internal structure of the charging terminal 300 may be the same as the pin terminal part 210 of FIG. 5, so a detailed description thereof will be omitted.

In the case of the charging terminal 300, the mobile device is charged using DC power which is output from a computer when the USB connector 390 of the cable is connected to the USB terminal of the computer.

INDUSTRIAL APPLICABILITY

According to the present invention, the charging apparatus for a mobile device charges the mobile device by magnetically coupling the mobile device and the charging mount using magnets while mutually matching electrical terminals, improving convenience of use. Further, when charging the mobile terminal, the terminal is coupled to the charging mount magnetically rather than mechanically, so that there is no need for separate efforts for coupling using connectors, and damage occurring due to frequent mounting can be fundamentally avoided. Further, the charging apparatus allows the mobile device to be freely attached to and detached from and rotated on the charging mount at any angle based on the arrangement of magnets, thereby improving convenience when charging the mobile device.

Furthermore, when charging the mobile device, the terminal and the charging mount are coupled using magnetic coupling with magnets, so that the charging operation becomes easy like an existing non-contact point type of charger.

The present invention has been described with reference to preferred embodiments. The ordinarily skilled person in the art to which the present invention pertains may implement other embodiments different from those described within the basic technical scope of the present invention. The technical scope of the invention is defined by appended claims, and all equivalents of the technical scope should be construed to be included in the present invention.

The invention claimed is:

1. A charging apparatus for a mobile device, comprising a terminal casing and a charging mount, wherein:
the terminal casing has a connector to be connected with a charging terminal of the mobile device, a pattern electrode part having concentric electrode patterns is provided on a backside thereof such that the pattern electrode is electrically connected with the connector, a first magnet is provided underneath the pattern electrode part, and a second magnet having multiple magnet elements is disposed around the pattern electrode part such that magnet elements are at the same distance from the pattern electrode; and
the charging mount has a pin terminal part having terminal pins which is to come into contact with the pattern electrode part, a third magnet is magnetically coupled with the first magnet and is provided underneath the pin terminal part, and a fourth magnet is magnetically coupled with the second magnet and has multiple magnet elements and is provided around the pin terminal part such that magnet elements are at the same distance from the pin terminal part in order to allow the terminal casing to be rotatable at a predetermined angle.

2. The charging apparatus according to claim 1, wherein the terminal pins in a pin terminal part are a type of a flat spring.

3. The charging apparatus according to claim 1, wherein the magnet elements of the fourth magnet in the charging mount are symmetrically disposed with each other along a circumference about the center of the pin terminal part, and the magnet elements of the second magnet in the terminal casing are disposed at positions that correspond to those of the fourth magnet.

4. The charging apparatus according to claim 1, wherein the second magnet has at least four magnet elements such that the terminal casing is rotatable by 90° on the charging mount, and the magnet elements of the fourth magnet are disposed at positions that correspond to those of the second magnet.

5. The charging apparatus according to claim 1, wherein the charging mount further includes a power delay circuit part mounted between an external input connector and the pin terminal part and designed to delay power supply to the pin terminal part and to monitor the power supply to the pin terminal part regarding whether or not the power level is below a predetermined level, and if the monitoring result is positive, to cut off the power supply to the pin terminal part.

6. The charging apparatus according to claim 1, wherein the first and second magnets of the terminal casing have opposite polarities to each other, and the third and fourth magnets of the charging mount have opposite polarities to each other.

7. The charging apparatus according to claim 1, wherein the second and fourth magnets have smaller sizes than those of the first and third magnets, respectively, and the sizes of the second and fourth magnets are the same.

8. The charging apparatus according to claim 2, wherein the pin terminal part has a shape in which a portion of the flat spring provided in the charging mount projects out through a hole.

9. The charging apparatus according to claim 1, wherein the terminal pins of the pin terminal part are disposed at different distances from a central terminal pin.

10. The charging apparatus according to claim 1, wherein the terminal pins of the pin terminal part and the electrode patterns of the pattern electrode part are disposed in a 1:1 matching manner such that the terminal pins are alternately disposed laterally at different distances from a central terminal pin that corresponds to a central electrode pattern of the pattern electrode part.

11. The charging apparatus according to claim 1, wherein an adapter is connected to the charging mount to convert AC power to DC power and supply the converted power.

12. A charging apparatus for a mobile device comprising a terminal casing and a charging terminal unit, wherein:
the terminal casing has a connector to be connected with a charging terminal of the mobile device, a pattern electrode part having concentric electrode patterns is provided on a backside thereof such that the pattern electrode is electrically connected with the connector, and a first magnet is provided underneath the pattern electrode part; and
the charging terminal unit has a pin terminal part having terminal pins which is to come into contact with the pattern electrode part, and a third magnet is magnetically coupled with the first magnet and is provided underneath the pin terminal part.

13. The charging apparatus according to claim 12, wherein the terminal pins in a pin terminal part are a type of a flat spring.

14. The charging apparatus according to claim 12, wherein a USB connector is provided to one side of the charging terminal unit to receive DC power.

15. The charging apparatus according to claim 13, wherein the pin terminal part has a shape in which a portion of the flat spring provided in the charging terminal unit projects out through a hole.

16. The charging apparatus according to claim 12, wherein the terminal pins of the pin terminal part and the electrode patterns of the pattern electrode part are disposed in a 1:1 matching manner such that the terminal pins are alternately disposed laterally at different distances from a central terminal pin that corresponds to a central electrode pattern of the pattern electrode part.

* * * * *